Patented Dec. 22, 1931

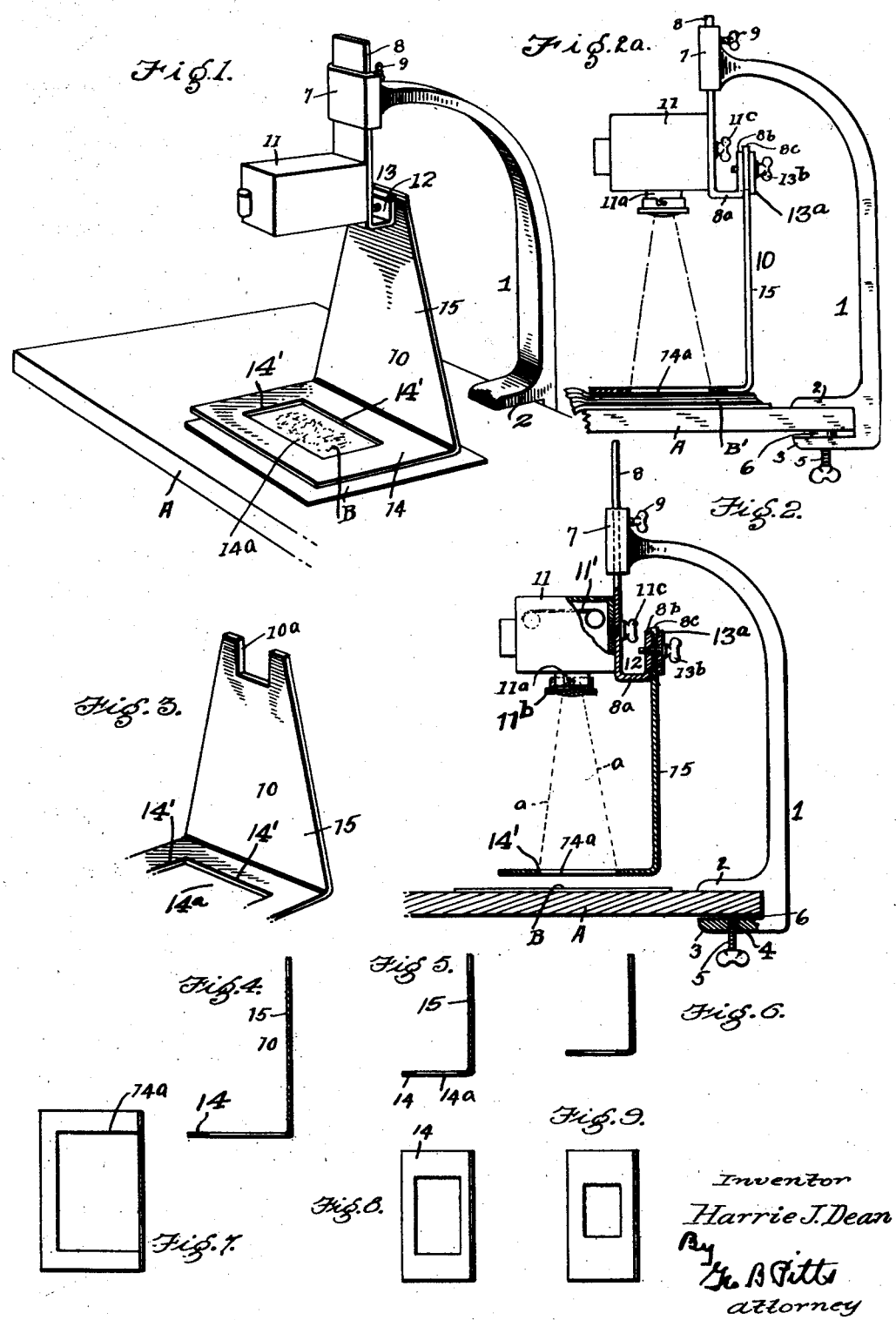

1,837,704

UNITED STATES PATENT OFFICE

HARRIE J. DEAN, OF LAKEWOOD, OHIO

APPARATUS FOR PHOTOGRAPHING

Application filed April 19, 1928. Serial No. 271,201.

This invention relates to apparatus for taking photographs, more particularly apparatus for photographing or copying pictures, charts, drawings, diagrams, and printed matter, including pages of books, folders and the like; the invention lends itself for use with a camera having a fixed focus but is not limited in its practical applications to such a camera.

One object of the invention is to provide improved apparatus of this character capable of photographing or copying views while insuring proper focus and centering of the view.

Another object of the invention is to provide apparatus of this character arranged to provide a mask for the view and means for holding the view in position.

Another object of the invention is to provide an apparatus for photographing views so constructed that the entire surface of the negative may be utilized irrespective of the size of the view, whereby in producing negatives or frames on a strip film all thereof will be of the same size.

Another object of the invention is to associate with a camera a combined focusing and centering device and to provide therefor a support or mounting, whereby they may be moved toward and from the view or its support to permit the positioning and removal of the views or objects to be photographed, while maintaining them in fixed relation and without changing the focus.

Another object of the invention is to provide an improved device for photographing sheets, pages of books and folders containing charts, diagrams, drawings, pictures, printed matter and the like that is relatively simple in construction, light in weight and readily positioned.

A further object of the invention is to provide a copying apparatus capable of making negatives of uniform size from views of different sizes in a ready manner.

Other objects of the invention will be apparent to those skilled in the art to which this invention relates from the following description taken in connection with the accompanying drawings, wherein Fig. 1 is a perspective view of an apparatus embodying my invention and a suitable camera arranged in position for photographing a view.

Fig. 2 is a view partly in section and partly in elevation.

Fig. 2a is a side view of the parts shown in Figs. 1 and 2, but showing the apparatus positioned for taking a picture from a book.

Fig. 3 is a fragmentary perspective view showing certain details.

Figs. 4, 5 and 6 are sectional views of different sized focusing devices.

Figs. 7, 8 and 9 are plan views of the respective devices shown in Figs. 4, 5 and 6.

My improved apparatus is adapted to be associated with a camera in photographing or copying views. By the term "views" I wish to comprehend pictures, printed matter, book pages, folders, charts, diagrams, and like data, or portions thereof whereby the same may be reproduced, for example, projected on to a screen. My improved apparatus is particularly useful in connection with cameras using as negatives what is known as motion picture or strip films, since these films carry a large number of negatives or frames and they may be used in projectors of any well known type; but it will be understood that the type and construction of the camera and the nature and kind of films or negatives therefor are immaterial and not a part of my invention. The apparatus is also particularly advantageous for use in connection with a camera having a fixed focus.

In the drawings, 1 indicates a support. The support may comprise a base portion, on which the view to be photographed is supported, and a standard, but in the preferred form of construction the support 1 is fashioned for clamping to the side edge of a table top or a suitable base A. In this arrangement, the table top or base serves as the support for the view, indicated at B, to be photographed. The support 1 comprises a member of suitable shape and provided at its lower end with a pair of spaced arms 2, 3, which fit over the table edge. One of these arms is formed with a screw threaded opening 4 into which is threaded a screw 5, preferably carrying at its inner end a clamping plate 6 arranged to engage the table in a well known manner. The upper portion of the member 1 has a laterally extending portion carrying a guide member 7. The guide member 7 may be of any suitable construction to form guides for a slide 8, but preferably comprises a thickened portion formed with an opening corresponding in shape to the cross sectional shape of the slide 8 and one wall is formed with a threaded opening for a set screw 9 which engages the slide 8 to secure it in any adjusted position desired according to the size of the focusing device, indicated as an entirety at 10, to be used. If desired, the surface of the slide 8 may be provided with a series of recesses to receive the inner end of the securing device 9 and effect an interlocking therewith.

11 indicates the camera having a stationary lens 11a and an auxiliary lens 11b, adapted to be removably mounted in operative relation to the lens 11a. Cameras of the type herein referred to usually include three auxiliary lenses either of which may be used in combination with the stationary lens 11a, thereby adapting the camera to copying three sizes of views. Within the camera are spaced spools (shown diagrammatically) for the film 11' and also a suitable mechanism (not shown) for moving the film predetermined distances to arrange each frame thereof in line with the lenses. The camera 11 is removably secured to the lower portion of the slide 8 by a clamping device, such as a thumb screw 11c extending through an opening in the slide 8 and engaging a threaded opening formed in the wall of the camera. The slide 8 is provided with a supporting portion 12 to which the focusing device 10 is suitably secured. In the preferred form of construction, the slide 8 is formed from a section of metal and its lower end portion is bent laterally, as shown at 8a, and bent upwardly, as shown at 8b, to form the supporting portion 12, the upper end of the focusing device 10 being removably secured to the portion 8b by a suitable clamping means 13. To insure a fixed relation between the focusing device 10 and the slide 8, for a purpose to be later set forth, I provide interlocking or registering elements between the device 10 and supporting portion 12. For this purpose, the end portion 8b is formed with a polygonally shaped boss 8c and the upper end of the device 10 is formed with a correspondingly shaped recess 10a to receive the boss 8c.

The boss 8c is preferably of less height than the thickness of the wall constituting the focusing member, so that when the clamping means 13 are operated, they will clamp the member 10 to the end portion 8b and the side walls of the boss 8c and recess 10a will prevent a movement or disalignment of the member 10 relative to the lens 11a. The clamping means 13 preferably comprises a plate 13a and a thumb screw 13b extending through an opening therein and threaded into an opening formed in the end portion 8b.

The focusing device 10 comprises a horizontal portion 14 and a vertical portion 15 preferably formed from a single section of material, such as sheet metal. When formed of sheet metal, each edge thereof may be folded over on itself to reinforce the section and to provide smooth or rounded edges as a protection when handled. The horizontal portion 14 may serve to engage the book, sheet or folder containing the view to be photographed to hold it flat or in position for photographing. As shown, the portion 14 is formed with an opening 14a, which serves to expose and center the view with respect to the lens 11a; the sides 14' of the opening forming a mask for the view B to provide a border for the resulting negative and to exclude those portions of the view not wanted to appear in the negative. The portion 15 serves as a distance member to insure the correct focus for the view B upon the frame of the film 11' exposed through the opening 14a, the length of the portion 15 being dependent upon the auxiliary lens 11b required to effect a focus of the view on the film frame. For example, if the view B to be photographed is equal in extent or area to the opening 14a formed in the device 10 shown in Figs. 5 and 8, then I use that auxiliary lens 11b which with the mask 14' holding the view at a predetermined distance therefrom, will focus it upon the film frame, the distance member 15 being of a length to support the mask at the required distance; if the view to be photographed is equal in extent or area to the opening 14a formed in the device 10 shown in Figs. 6 and 9, then I use that auxiliary lens 11b which, with the mask 14' holding the view at a predetermined distance, will focus it upon the film frame, the distance member 15 being of a length to support the mask 14' at the required distance; and if the view B to be photographed is equal in extent or area to the opening 14a formed in the device 10 shown in Figs. 4 and 7, then I use that auxiliary lens 11b which, with the mask 14' holding the view at a predetermined distance therefrom will focus it upon the film frame, the distance member being of a length to support the mask at the required distance. In each instance, the mask will center the view with respect to the lenses and the image on each film frame will occupy the entire area thereof and hence all of the negatives resulting will be of uniform size.

The opening 14a is so arranged that when the focusing device 10 is clamped to and interlocked with the supporting portion of the slide 8, as already set forth, the view B is centered with respect to the lens 11a. The clamping means 13 permit the focusing device 10 to be readily removed and another device substituted according to the auxiliary lens 11b to be used. In the drawings, the focusing devices 10 are shown as formed with view exposing and centering openings 14a of rectangular shape, but such opening may be round, oval or of any other shape.

Figs. 7, 8 and 9 show three focusing devices the openings in which are similar in shape, but of different sizes, these sizes having been found by me to be sufficient for practical purposes in photographing views of varying sizes on what is generally termed motion picture or strip films. In using any one of these devices according to the size of the view, to be photographed, I use in connection with the lens 11a an auxiliary lens 11b which will insure the proper focus of the reflected rays upon the film frame. Thus it will be seen that by proportioning the distance member 15 to the auxiliary lens the view will be properly focused upon the film frame and occupy the entire area thereof; accordingly, by interchange of the focusing devices and lenses, views of different sizes may be photographed, but the resulting negatives will be of similar size.

In my construction, the camera 11 and any one of the focusing devices 10 are secured to the slide 8 in rigid relation to each other. By moving the slide 8 upwardly, both the camera and device 10 will be bodily raised or moved away from the table A or other support (upon loosening of the screw 9) and permit the view B to be laid thereon; by moving the slide downwardly until the mask is close to or engages the view, the camera will be in operating relation to the view. As will be noted, the movements are carried out, without affecting either the relation of the centering openings 14a with respect to the lens 11a or the negative or the distance between the mask and the lenses.

Accordingly, any number of views may be readily photographed successively while maintaining the proper focus therefor. By adjusting the slide 8 to move the holding portion 14 against the view and securing the slide in such position, the view may be firmly held against the table A while being photographed. This is advantageous in photographing pages of books or sheets which have been folded, since they may be held in open position with sufficient pressure without danger of damaging them, as shown in Fig. 2a.

This mounting is also advantageous in that the support for or plane in which each view lies, when being photographed, is relatively fixed, and no adjustment thereof is required for different views of the same or different sizes. This insures that the light required in photographing the views, whether natural or artificial will not have to be adjusted or changed or the table A adjusted or moved.

The mounting of the camera and focusing device on the slide enables the camera and device to accommodate themselves to a view B supported at any distance above the table A; for example in photographing the exposed page of an open book, that portion of the book below the exposed page may be of varying thickness, but as the camera and focusing device are adjustable while maintained in fixed relation, the page will be properly focused on the film frame when the holding portion 14 or mask is brought into engagement therewith irrespective of the thickness of that portion of the book below such page.

The several focusing devices being of similar shape, they may be stored in nested relation.

While I have described my invention in connection with the photographing of views on sheets of paper, folders or book pages, it may be used to take photographs of things other than what has been defined herein as views.

To those skilled in the art to which my invention relates, many changes in construction and widely differing embodiments and applications of my invention will suggest themselves without departing from the spirit and scope thereof. My disclosures and the description herein are purely illustrative and are not intended to be in any sense limiting.

What I claim is:

1. An apparatus of the class described, the combination of a support, a slide movably mounted thereon and adapted to support a camera, and a device mounted on said slide and adapted to focus the view to be photographed thereby and to center the view with respect to the camera lens, said device comprising a distance member and a portion formed with an opening, through which the view is exposed, in fixed relation to the lens of the camera.

2. An apparatus of the class described, the combination of a support, a slide movably mounted thereon and adapted to support a camera, and a device mounted on said slide and adapted to focus the view to be photographed thereby and to center the view with respect to the camera lens, said device comprising a distance member and a portion formed with an opening, through which the view is exposed, in fixed relation to the lens of the camera, and the side walls of the opening serving as a mask for the view.

3. In apparatus of the class described, the combination of a support, a slide movably mounted thereon and a device mounted on said slide and adapted to be associated with a camera and serving to focus the view to be photographed thereby, said device comprising a distance member detachably connected at its inner end to said slide and means carried by its outer end and arranged to engage portions of the view to hold it in focusing position.

4. In apparatus of the class described, the combination of a support, a slide movably mounted thereon and adapted to support a camera, a device on said slide having a portion disposed in spaced relation to the lens of the camera and formed with an opening through which the view to be photographed is exposed and means for removably connecting said device to said slide and interlocking it therewith to insure a fixed relation between the lens of the camera and said opening, whereby the view is centered with respect to the camera lens.

5. In apparatus of the class described, the combination with a base on which a view to be photographed may rest, of a support mounted on said base, a slide movably mounted on said support and adapted to support a camera, and a device mounted on said slide and comprising a longitudinal extending member having a length determined by the focus of the camera lens and a member carried by the outer end of said longitudinal member and arranged to engage the view and hold it on said base, and means for adjusting said slide whereby the camera and said device may be moved toward said base with said member engaging the view to hold it while being photographed.

6. In apparatus of the class described, the combination of a support, a slide movably mounted thereon and adapted to support a camera, and a device removably mounted on said slide and comprising a longitudinally extending distance member and a member on the outer end thereof extending laterally to a position below the camera and formed with an opening in fixed relation to the camera lens to expose the view to be photographed.

7. In apparatus of the class described, the combination of a support, a slide movably mounted thereon and adapted to support a camera, and a device removably mounted on said slide and comprising a longitudinally extending distance member and a member on the outer end thereof extending laterally to a position below the camera and formed with an opening in fixed relation to the camera lens to expose the view to be photographed, and the side walls of the opening serving as a mask for the view.

8. In apparatus of the class described, the combination with a back against which a view to be photographed may rest, of a support mounted on said back and adapted to support a camera, said support including a slide movable toward and from said back, and a device connected to and movable with said slide, said device comprising a distance member connected to said slide at its inner end and carrying at its outer end a member shaped to expose the view to be photographed and to engage marginal portions of the view and hold it against said back when said slide is moved toward the latter.

In testimony whereof, I have hereunto signed my name.

HARRIE J. DEAN.